May 1, 1962   E. R. DUDLEY   3,032,709
FLOW CONTROL DEVICE
Filed Sept. 30, 1957   2 Sheets-Sheet 1
FIG_1
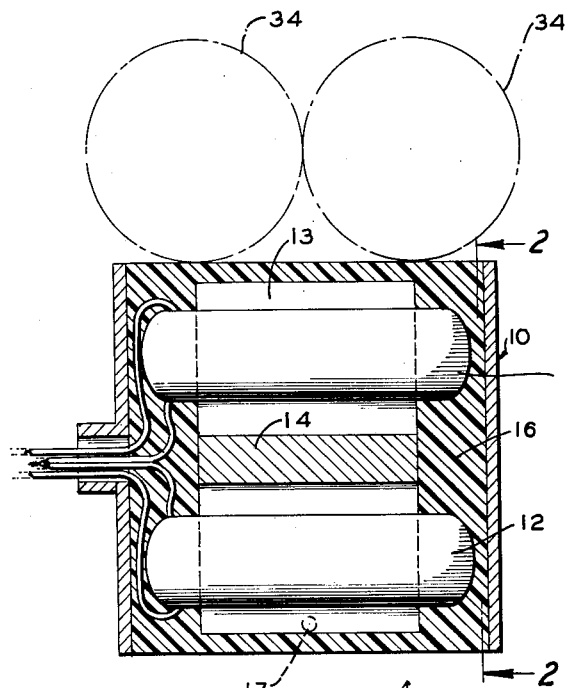
FIG_2
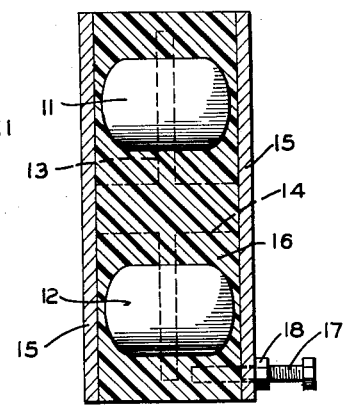
FIG_3
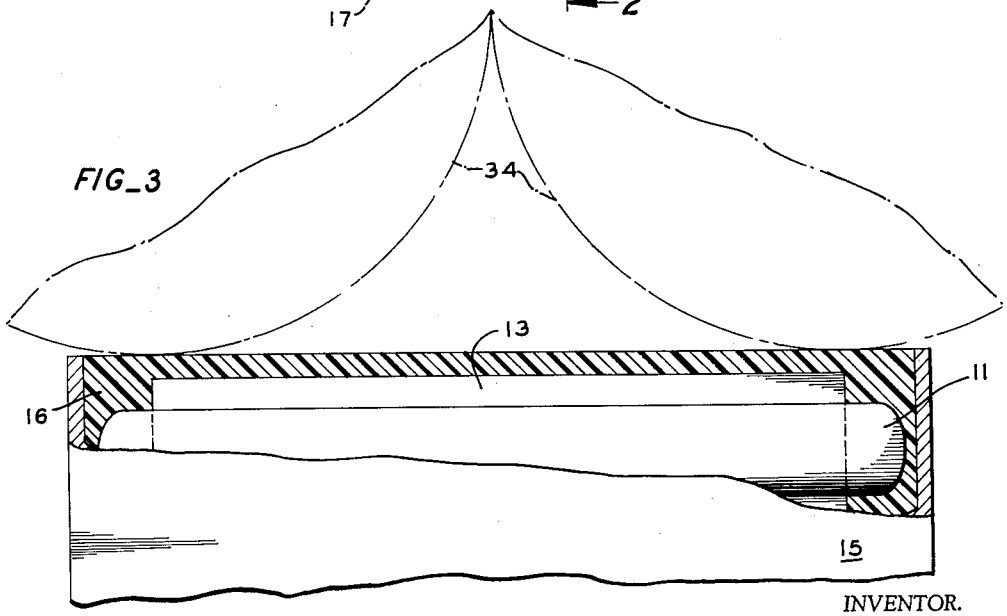
INVENTOR.
EDMOND R. DUDLEY
BY
ATTORNEY May 1, 1962 E. R. DUDLEY 3,032,709
FLOW CONTROL DEVICE Filed Sept. 30, 1957 2 Sheets-Sheet 2

INVENTOR.
EDMOND R. DUDLEY
BY Edward B. Hy
ATTORNEY

United States Patent Office 3,032,709
Patented May 1, 1962

3,032,709
FLOW CONTROL DEVICE
Edmond R. Dudley, Santa Clara, Calif., assignor to Peerless Equipment Company, Mountain View, Calif., a corporation of California
Filed Sept. 30, 1957, Ser. No. 686,915
3 Claims. (Cl. 324—41)

This invention relates to a flow control device. More particularly this invention relates to an electrical device having one or more sensing heads which can be placed at a strategic location in proximity to a passageway through or along which metal objects such as metal cans pass; which will sense an unusual or abnormal condition at such location; and which will give an appropriate signal.

By way of example, empty cans may normally pass along a can chute or passageway at a uniform rate and in evenly spaced relation from one point to another in a cannery. If a jam occurs such that empty cans back up in the passageway, it will be desired to stop the flow of cans.

It is a function of a flow control device intended for such purposes to sense a departure from normal operation and to provide a signal or impulse which will stop a motor, light a signal lamp, sound a signal buzzer or bell and/or perform some other appropriate function.

Flow control devices have been provided for such purposes but have been subject to serious disadvantages. One type of prior flow control device employs a sensing head comprising a coil having an iron or steel core, and a balanced circuit whose normal condition of balance is disturbed when a metal object such as a metal can comes to rest in close proximity to the coil. A defect of this particular device is that its electromagnetic characteristics and its mode of operation drift by reason of temperature variances.

It is an object of the present invention to provide an improved flow control device.

A particular object of the invention is to provide a flow control device which comprises a centrally located control panel and circuit and an exterior sensing head (i.e., a sensing head which can be located remotely from the control panel and main circuit) such device being insensitive to temperature variances.

These and other objects of the invention will be apparent from the ensuing description and the appended claims.

Certain forms of the invention are illustrated by way of example in the accompanying drawings, in which:

FIGURE 1 is a view in longitudinal section of the sensing head of the present invention.

FIGURE 2 is a transverse section taken along the line 2—2 of FIGURE 1.

FIGURE 3 is a fragmentary view of the sensing head of FIGURES 1 and 2, shown on a larger scale with a portion of the cover broken away and showing cans in juxtaposition to one of the coils.

Figure 6:
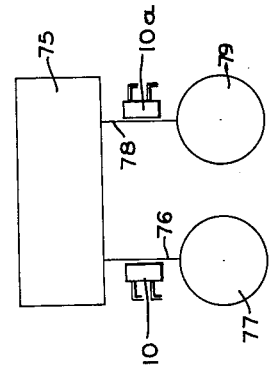
FIGURES 5 and 6 are diagrammatic views showing embodiments of the invention wherein multiple sensing heads are employed.

In accordance with the present invention I provide a circuit in the form of two pairs of elements which form a Wheatstone bridge type of circuit with impedance elements in place of resistance elements. Two of these elements (the "first pair") constitute the sensing head and are balanced with the other or "second" pair. The balance is disturbed by proximity of a metal object (e.g., a metal can). I also provide a selective circuit which rejects those signals resulting from unbalancing the Wheatstone circuit caused by normal progression of cans or other metal objects. This selective circuit is actuated by (i.e., it "selects") those signals which are caused by an abnormality in the progression of metal cans or other metal objects. The first pair of impedance elements are arranged in close proximity to one another, preferably in a single housing to form a single sensing head, and they are located remotely to the second pair of impedance elements and to the selective circuit.

By this means, since the temperature ambient to the sensing head is uniform, and since the temperature ambient to the second pair of impedance elements and to the selective circuit can be made uniform, temperature differences are minimized. Also a greater flexibility of operation is permissible, as will become apparent.

Referring now to FIGURES 1, 2 and 3 of the drawings, a sensing head is there shown which is generally designated by the reference numeral 10 and which comprises a pair of coils 11 and 12 which are spaced somewhat apart, e.g. ½ inch and which have a common core 13 of iron or steel which is connected by a cross plate 14 to steel side walls 15. It is not essential that a common core be employed; two separate cores may be used. However, construction-wise a common core is preferred. The space between the plates 15 is filled with a suitable resin 16, for example, any of the well-known cold setting resins such as an epoxy resin. The function of the resin is to immobilize the interior elements of the sensing head 10 and to insulate them from moisture and air. Also shown is an adjustment screw 17 which is locked in adjusted position by a lock nut 18. The function of the adjustment screw 17 is to properly balance the coils 11 and 12.

Figure 4:
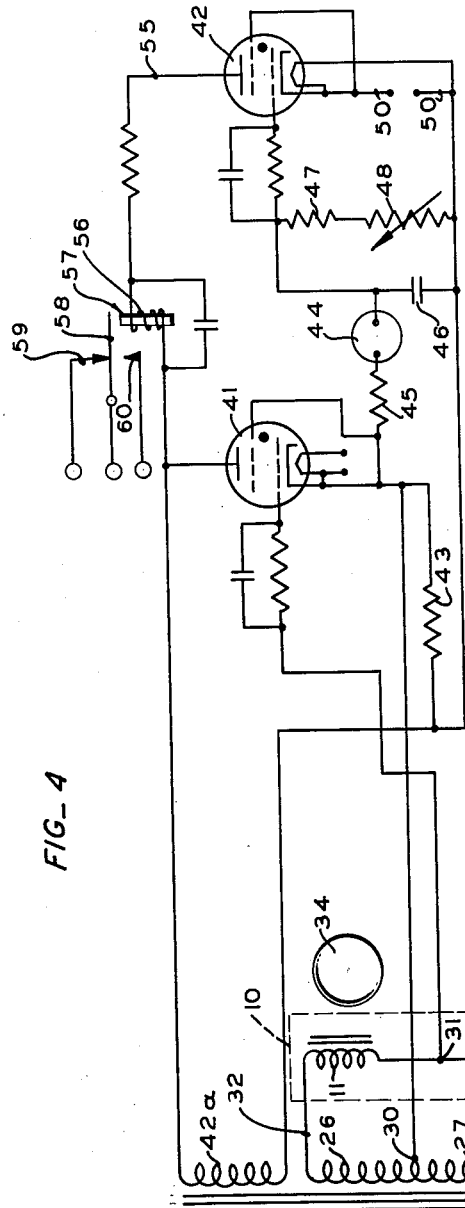
FIGURE 4 is a diagrammatic circuit of the device of the invention.

Referring now to FIGURE 4, the sensing head 10 is shown diagrammatically as part of a balanced circuit 25 which forms part of a larger circuit. The balanced circuit 25 also comprises a pair of coils 26 and 27. The coils 11, 12 will be sometimes referred to as the "first pair" of coils and the coils 26, 27 as the "second pair" of coils. The four coils 11, 12, 26 and 27 are connected as in a Wheatstone bridge. The balanced or Wheatstone circuit 25 is powered by a coil 29 which is connected to a suitable A.C. source of power, for example, a 117 volt, 60 cycle A.C. source. As will be seen the coils 26 and 27 are actually a single coil which is divided or tapped at 30. The coils 11 and 12 are tapped at 31. Connections between the second pair of coils 26, 27 and the first pair of coils 11, 12 are shown at 32 and 33. The latter wires, i.e., those indicated at 32 and 33, are of indeterminate length so that the sensing head 10 can be located remotely to the coils 26 and 27 and to the selective circuit.

A metal can is shown at 34 in proximity to the coil 11. It will, of course, alter the impedance of the adjacent coil and disturb the balance of the Wheatstone bridge circuit 25, hence will give rise to a signal. It is desired to reject those signals which are caused by cans passing by in regular, normal progression, each being in close proximity to the coil 11 for a predetermined short interval of time. It is further desired to select any signal caused by an abnormal condition which causes a can to remain in close proximity to the coil 11 for a greater length of time. This selectivity is obtained by means of a selective circuit which is generally designated by the reference numeral 40.

The selective circuit 40 comprises two thyratron tubes 41 and 42, each having a filament, a cathode, a control grid, a screen grid and a plate as conventionally indicated. The tube 41 is powered by a coil 42 through a resistance 43. The characteristics of the tube 41 (which may be a 2D21 thyratron) are such, and a negative bias of such magnitude is maintained on the control grid of tube 41

(by reason of the fact that the tap 30 is in offcenter position) that the tube 41 normally operates. Therefore, a current passes through a neon tube 44 via a resistance 45 during each half cycle. The current thus passed by the neon tube 44 charges a condenser 46 which discharges through a fixed resistance 47 and a variable resistance 48. The variable resistance 48 is adjusted to introduce a time delay or lag of predetermined character for a purpose described hereinafter.

The delay or lag imposed on the discharge of the condenser 46 by reason of the resistances 47 and 48 is such that, during normal operation with the neon tube 44 passing current during each half cycle, a positive bias is maintained on the control grid of tube 42 of such magnitude that the tube 42 continues to operate. The tube 42 is powered by a coil 49 by way of wires 50, the applied voltage being such that the tube 42 passes current and operates during normal operation of the neon tube 44. As will be seen, the plate of tube 42 is connected by a wire 55 and a coil 56 of a solenoid 57 to the coil 42a which is powered by the coil 29. The solenoid 57, while operating and energized in the manner indicated, maintains a movable contact element 58 in contact with a fixed contact element 59. However, if the solenoid 57 is de-energized the movable contact element 58 will automatically break its contact with the fixed contact 59 and will contact another fixed contact 60.

During normal operation, that is, while metal cans (one of which is shown at 34 in FIGURE 4) are passing by the coil 11 of sensing head 10 in regularly spaced relation and at normal speed, each can as it comes into close proximity to the coil 11 will disturb the balance of the Wheatstone bridge circuit 25 and the bias on the control grid of tube 41 is altered so that tube 41 ceases momentarily to operate. Specifically, in the preferred operation, the bias on the control grid of tube 41 normally is maintained at a value exceeding minus 3 volts; i.e., minus 3.1 volts or more. When the bias drops to a negative value which is less than minus 3 volts, or becomes zero or positive, the tube 41 ceases to operate. This occurs each time a can comes into close proximity to the coil 11 but during normal operation each can remains in close proximity to the coil 11 for only a very short period of time. The delay or lag built into the circuit by the condenser 46 and the resistances 47 and 48 are such that the tube 42 operates continuously. By suitable adjustment of the variable resistance 48 this delay is such that the circuit 40 rejects brief signals of momentary duration during which tube 41 ceases to operate. However, when a jam occurs, or when some other abnormal condition occurs such that a can 34 remains in close proximity to the coil 11 for a period of time exceeding a predetermined value, then the condenser 46 discharges to a point such that the tube 42 ceases to operate. The solenoid 57 is therefore de-energized and the position of the movable contact element 58 is shifted. By this means a motor can be stopped, a signal lamp can be lit, a signal buzzer or bell can be sounded and/or some other appropriate operation can be carried out.

Typical examples of application of the above described circuit and sensing device are as follows:

A motor-operated can lifter may lift cans to an elevated, overhead can chute down which the cans roll by gravity. If a jam occurs at the outlet end of the overhead chute and, as a result, cans back up in the chute, it is desirable to terminate operation of the motor which operates the can lifter. By placing a sensing head, such as that shown at 10, at a convenient location along the overhead chute, it will sense a jam and can be made to shut off the motor which operates the lifter and to light a signal lamp and/or sound a buzzer or bell.

The device can also be employed to sense and signal the absence of a metal can in a moving line of cans, or the absence of a metal closure on a bottle in a moving line of bottles. Taking the case of a line of moving cans, such cans normally pass by a sensing station in regularly spaced relation. The sensing head is so situated and is of such dimensions that it will at all times bridge two successive cans, provided the cans are moving by in normally spaced relation. The adjustment screw 17 will be adjusted to balance the coils 11 and 12 under this condition. Therefore, when a can body is missing the two coils 11 and 12 are thrown out of balance and a signal is given which can be employed to light a signal lamp, or sound a buzzer or bell. Alternatively, and if the normal spacing of the cans exceeds the span of the sensing head 10, the variable resistance 48 will be adjusted so that tube 42 is extinguished when an abnormally long space exists between moving cans, such abnormally long space being caused by a missing can body or missing can bodies.

It is a further advantage of the device of the present invention that it embodies two paired legs or elements (the coils 11, 12 of the Wheatstone bridge circuit 25), in the same head in close proximity to one another, and that the other elements of the circuit may be located, and usually will be located adjacent a control panel. Thus, the sensing head may have to be placed in a relatively warm location while the coils 26, 27 may be placed in a relatively cool location. Such temperautre differences affect the impedances of the coils 11, 12, 26 and 27. However, due to this paired arrangement in accordance with the present invention, such temperature differences do not affect operation of the device because the paired coils 11 and 12 do not change relatively to one another, and the paired coils 26 and 27 can be located so that they do not change temperature relatively to one another.

Another important advantage of the device of the present invention is that a single control panel consisting of two coils 26, 27 and the selective circuit 40 can be used to operate two or more sensing heads. Two examples will suffice to illustrate the advantage of employing two or more sensing heads.

Figure 5:
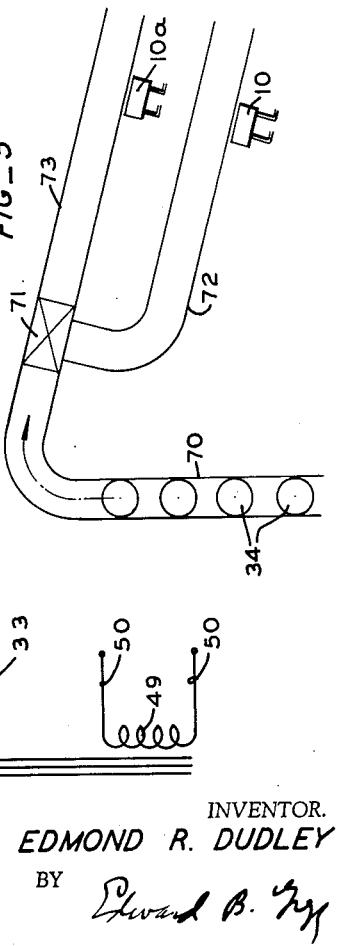

Suppose, for example, it is desired to lift cans by a motor driven can lifter to an overhead can chute, to divide the cans in the overhead chute equally and to remove one-half of the cans through one exit chute and the other half through another exit chute. If either of the exit chutes should become jammed and cans should back up, it is desirable to stop the motor which operates the can lifter. Referring to FIGURE 5, a can lifter is shown at 70, a divider at 71 and exit chutes at 72 and 73. A first sensing head 10 will be located adjacent the exit chute 72 and a second sensing head 10a will be located adjacent the exit chute 73. Each sensing head will sense a jam in its particular chute and will stop the can lifter motor whenever a jam occurs.

By way of a second example, it is common practice to stamp out can covers two at a time by means of a double punch press and to supply the output of the two punches to a pair of curlers which form curls on the can covers. If either curler malfunctions and can covers supplied to it back up, it is desirable to stop the punch press. Referring to FIGURE 6, a double punch press is shown at 75 which supplies can covers by a first cover feed 76 to a first curler 77 and by a second cover feed 78 to a second curler 79. A first sensing head 10 is located adjacent the cover feed 76 and a second sensing head 10a is located adjacent the cover feed 78. If a jam should occur in either of the curlers it will cause a piling up or backing up of can covers ir the respective cover feed. The respective sensing head 10 or 10a will sense this condition and it will stop the punch press and, if desired, will actuate a suitable visble or audible signal.

It is, therefore, apparent that a device has been provided which is capable of use as a flow control device, more particularly in connection with a moving line of metal objects such as can bodies, can covers, metal bottle stoppers and the like. This device is relatively simple in its construction, dependable in its operation, readily adjustable for different conditions and has several important advantages such as insensitivity to temperature variances and the possibility of employing multiple sensing heads.

I claim:

1. A control system of the character described adapted to sense motion and absence of motion of a succession of generally cylindrical ferrous metal objects such as metal cans, said system comprising: A sensing head comprising a first pair of coils including a face coil for location adjacent and nearer a moving line of ferrous metal cans and a back coil for location more remotely from such line of cans, a core for said coils having an elongated face parallel to the direction of motion of said objects, the length of said face being substantially equal to the spacing between the centers of said objects, and means forming a rigid mechanical connection between said coils such that their spatial interrelation remains constant, one end of each said coil being electrically connected to one end of the other of said coils; a second pair of coils remote from said first pair of coils, said first and second pairs of coils being connected together to form the four branches of a Wheatstone bridge; and a sensing circuit connected to the output of said bridge, said sensing circuit including a control element having an "on" position and an "off" position, said sensing circuit functioning to maintain said control element in one such position while ferrous metal cans or the like are moving adjacent said face coil and functioning to maintain said control element in its other position while a ferrous metal can or the like is stationary and adjacent said face coil.

2. A sensing head of the character described for a succession of separate ferrous objects of uniform size, comprising a pair of sensing coils electrically connected together at one end, their other ends being connectable to a remote pair of coils to form a bridge circuit, a housing completely enclosing both said sensing coils and sealing them from the atmosphere, means immobilizing said coils within said housing so that they maintain the same spatial relation to each other, said housing having parallel sides of ferromagnetic material and elongated in the direction of motion of said objects, and including a ferromagnetic core for said coils, said core having an elongated face substantially equal in length to the distance between the centers of said ferrous objects, and means for selectively adjusting the impedance of a single member of said pair of coils.

3. A control system of the character described comprising: A sensing head having a pair of sensing coils including a face coil, a back coil, a ferromagnetic core having an elongated face, reluctance adjusting means for adjusting the reluctance of the magnetic circuit associated with one of said coils and an enclosure housing said coils adjacent one another and in such manner that the sensing head can be situated with its face coil and core parallel to and adjacent a moving line of separate ferrous metal objects such as ferrous metal cans and with its back coil more remote from such line of metal objects, the face of said core in the direction of the motion of said objects being at least as long as the center to center spacing of said objects, whereby the reluctance of the magnetic circuit of said face coil is caused to vary at a frequency determined by the rate of motion of said metal objects; said system also comprising a second pair of coils remotely connectable to said sensing coils to form a bridge circuit capable of an output pulsing at a frequency determined by the rate of motion of metal objects past said face coil.

References Cited in the file of this patent

UNITED STATES PATENTS

| | | |
|---|---|---|
| 1,957,222 | Mershon | May 1, 1934 |
| 1,969,536 | Winne | Aug. 7, 1934 |
| 2,481,345 | Reynst | Sept. 6, 1949 |
| 2,508,494 | Cook et al. | May 23, 1950 |
| 2,587,664 | Stout | Mar. 4, 1952 |
| 2,703,384 | Rendel | Mar. 1, 1955 |
| 2,806,181 | Rockafellow | Sept. 10, 1957 |
| 2,863,546 | Josefowicz | Dec. 9, 1958 |

FOREIGN PATENTS

| | | |
|---|---|---|
| 565,561 | Great Britain | Nov. 16, 1944 |

OTHER REFERENCES

Batcher: Article in Electronic Industries, April 1944, pages 94, 95, 198 and 200.